US009042506B2

(12) United States Patent
Chalamala et al.

(10) Patent No.: US 9,042,506 B2
(45) Date of Patent: May 26, 2015

(54) DISCRETE SIGNAL SYNCHRONIZATION BASED ON A KNOWN BIT PATTERN

(71) Applicant: TATA CONSULTANCY SERVICES LIMITED, Mumbai (IN)

(72) Inventors: Srinivasa Rao Chalamala, Hyderabad (IN); Krishna Rao Kakkirala, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 14/033,216

(22) Filed: Sep. 20, 2013

(65) Prior Publication Data
US 2014/0198888 A1 Jul. 17, 2014

(30) Foreign Application Priority Data
Jan. 15, 2013 (IN) .......................... 137/MUM/2013

(51) Int. Cl.
*G06F 17/14* (2006.01)
*H04L 7/00* (2006.01)

(52) U.S. Cl.
CPC ............. *G06F 17/148* (2013.01); *H04L 7/0008* (2013.01)

(58) Field of Classification Search
CPC ..... H04L 7/004; H04L 7/0058; H04L 7/0087; H04L 7/0334; H04L 7/044; H04L 7/10; H04L 25/0391; H04L 25/49; H04L 25/4915; H04L 25/4917; H04L 7/0008; G06F 17/148
USPC ......... 375/259, 260–262, 264, 354, 367–379; 370/208, 210, 350, 515
See application file for complete search history.

(56) References Cited

U.S. PATENT DOCUMENTS

| | | | |
|---|---|---|---|
| 6,628,737 B1 | 9/2003 | Timus | |
| 8,159,610 B2 | 4/2012 | Cooper | |
| 2006/0238386 A1* | 10/2006 | Huang et al. | ..................... 341/50 |
| 2007/0160304 A1* | 7/2007 | Berkner et al. | ............... 382/240 |
| 2009/0125310 A1 | 5/2009 | Lee et al. | |
| 2014/0005815 A1* | 1/2014 | Kakkirala et al. | .............. 700/94 |

OTHER PUBLICATIONS

Shaoquan Wu et. al., "Self-synchronized audio watermark in DWT domain," Circuits and Systems, 2004, ISCAS '04, Proceedings of the 2004 International Symposium, pp. V-712-V-715 vol. 5, May 23-26, 2004. (Abstract only).
Shaoquan Wu et. al., "Efficiently Self-Synchronized Audio Watermarking for Assured Audio Data Transmission," IEEE Transactions on Broadcasting, 51(1):69-76, Mar. 2005.

* cited by examiner

*Primary Examiner* — Young T Tse
(74) *Attorney, Agent, or Firm* — Seed IP Law Group PLLC

(57) ABSTRACT

Systems and methods for discrete signal synchronization based on a known bit pattern are described. In one aspect of the present subject matter, a discrete signal synchronization system is configured to synchronize a preprocessed discrete signal with a modified discrete signal. The system comprises a processor and a synchronization module coupled to the processor. The synchronization module comprises an extraction module and comparison module. The extraction module determines a bit pattern from the modified discrete signal using Discrete Wavelet Transformation (DWT) and Singular Value Decomposition (SVD). The comparison module compares the determined bit pattern with a known bit pattern of the preprocessed discrete signal and records a time point at which the determined bit pattern matches with the known bit pattern of the preprocessed discrete signal as a synchronization point.

20 Claims, 3 Drawing Sheets

DISCRETE SIGNAL SYNCHRONIZATION BASED ON A KNOWN BIT PATTERN

TECHNICAL FIELD

The present subject matter relates, in general, to signal synchronization and, particularly but not exclusively, to discrete signal synchronization based on a known bit pattern.

BACKGROUND

Discrete signal synchronization refers to synchronization of time, phase, or amplitude of a received discrete signal with any reference discrete signal. The reference signal can be, for example, a different version of the received discrete signal, a different discrete signal, a clock signal, etc. Discrete signal synchronization is typically used when two incoming signals are to be compared or processed together or processed sequentially. Synchronization ensures that signal features used for processing do not differ because of time lag or lead and that the signal features are processed in a desired logical order. Thus, the accuracy of synchronization determines the quality of the signal processing in a signal.

Typically, to achieve the synchronization in discrete signals, a synchronization pattern is inserted into a signal before processing. The synchronization pattern is extracted after processing and is used to synchronize the processed signal so that data is sampled at the proper time and at proper intervals. However, the insertion of the synchronization pattern typically leads to a change in characteristics of the signal. Further, the signal may undergo changes due to channel effects, downsampling, upsampling and other processing that may occur before the extraction of the synchronization pattern. As a result, the synchronization pattern may not be extracted accurately, resulting in poor synchronization and poor quality of signal processing.

SUMMARY

This summary is provided to introduce concepts related to discrete signal synchronization and these concepts are further described below in the detailed description. This summary is not intended to identify essential features of the claimed subject matter nor is it intended for use in determining or limiting the scope of the claimed subject matter.

Systems and methods for discrete signal synchronization based on a known bit pattern are described. In one aspect of the present subject matter, a discrete signal synchronization system is configured to synchronize a preprocessed discrete signal with a modified discrete signal. The system comprises a processor and a synchronization module coupled to the processor. The synchronization module comprises an extraction module and a comparison module. The extraction module determines bit patterns of modified discrete signal using Discrete Wavelet Transformation (DWT) and Singular Value Decomposition (SVD). The comparison module compares the determined bit pattern with a known bit pattern of the preprocessed discrete signal and records a time point at which the determined bit pattern matches with the known bit pattern of the preprocessed discrete signal as a synchronization point.

BRIEF DESCRIPTION OF THE DRAWINGS

The detailed description is described with reference to the accompanying figures. In the figures, the left-most digit(s) of a reference number identifies the figures in which the reference number first appears. The same numbers are used throughout the figures to reference like features and components. Some embodiments of the method(s) in accordance with the present subject matter are described, by way of example only, and with reference to the accompanying figures, in which.

Figure 1:
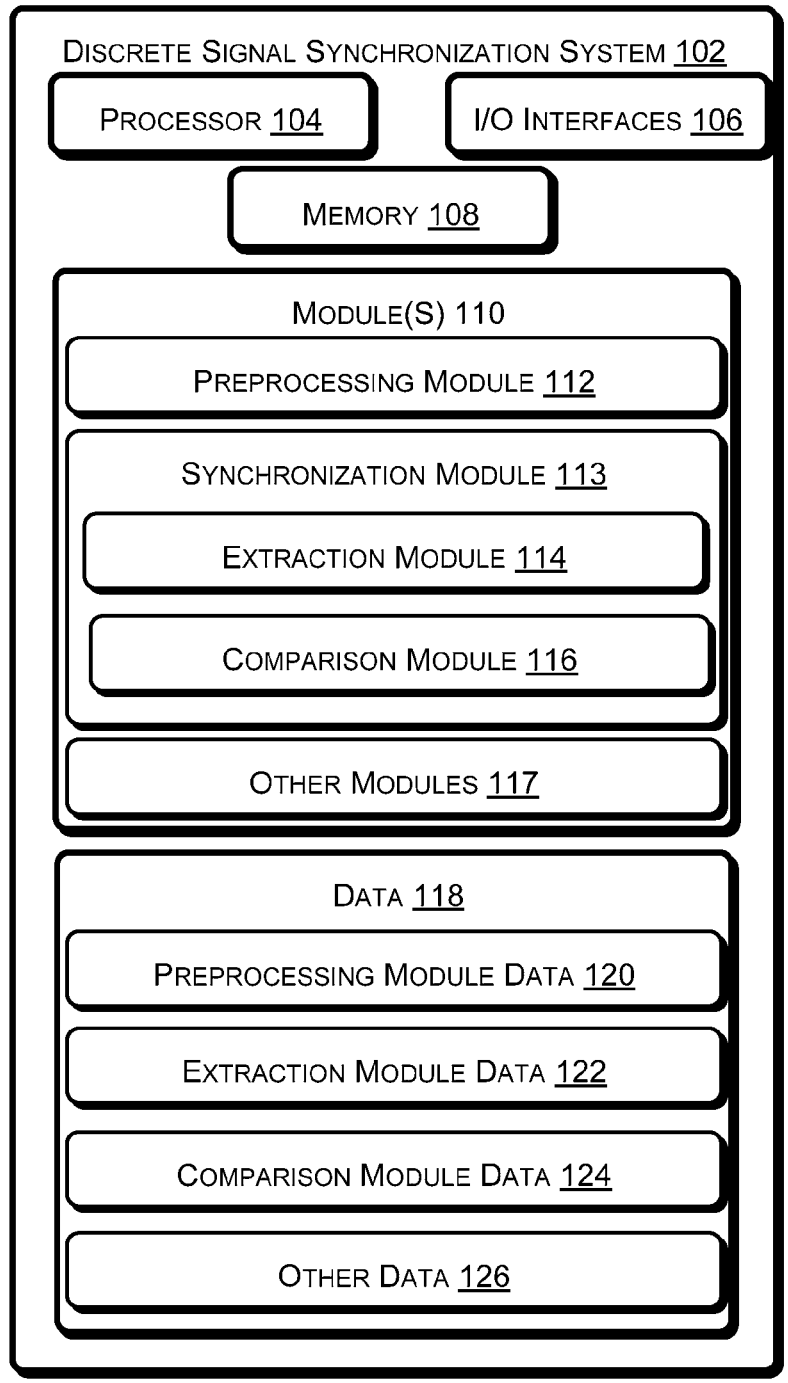
FIG. 1 illustrates a system for discrete signal synchronization in accordance with an embodiment of present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which can be substantially represented in computer readable medium and so executed by a computer or processor, whether or not such computer or processor is explicitly shown.

DETAILED DESCRIPTION

Systems and methods for synchronization of discrete signals are described herein. The systems and methods can be implemented in a variety of electronic devices, such as laptops, tablet-computers, desktop computers, servers, mobile communication devices, discrete devices, consumer electronics, and the like. Although the description herein is with reference to a discrete signal synchronization system, the systems and methods can be implemented in other electronic devices, albeit with a few variations, as will be understood by a person skilled in the art. Further, a person skilled in the art will comprehend that the embodiments of the present subject matter are not limited to any particular communication system, architecture or application device, as they can be adapted to take advantage of new computing systems and platforms as they become available.

Typically, two or more discrete signals have to be synchronized in discrete signal processing systems for efficient signal processing. For example, a signal may have to be synchronized with a modified version of the signal. The modified version of the signal can be produced due to upsampling, downsampling or application of any other known discrete signal processing technique on the signal. Conventionally, the synchronization is effectuated by including a reference symbol bit in the signal. A time domain correlation can be then determined between a bipolar version of the bit added and a bipolar version of a bit extracted from the modified version of the signal to identify the point in time from where the signals are in synchronization. In order to achieve a well detectable correlation peak, the reference symbol is made of a plurality of synchronization known bit patterns, which are repeated several times in one time period.

However, the addition of a synchronization known bit pattern to a signal typically leads to changes in signal characteristics and variation in information that the signal carries. Such changes in signal characteristics are undesirable and can lead to disturbance in signal transmission, for example, it can cause noise in audio signals. Also, as the signal may be modified after the synchronization known bit patterns are added, some of the synchronization known bit patterns may be lost and hence synchronization may not be accurate.

There are methods for processing signals to add known bit patterns that do not change the characteristics of signal, for example by watermarking, those are largely used for checking the integrity of signal received at the receiver. Typically, by watermarking, signals can be modified such that the embedded code is imperceptible or nearly imperceptible to the user or embedding a code does not change the characteristics of the signal which are critical to the application, and yet can be detected through an automated detection process. Moreover, the embedded code does not distort the signal to such an extent that it renders the signal unusable or drastically alters both the time and frequency characteristics of the original signal. However, conventional watermark embedding methods are complicated and have to use a block-wise approach in case the watermark is also to be used for synchronization. Further, each watermarking method differs by several characteristics such as extent of original signal characteristics retained, ability to retain bits after signal processing/modification operations, and the like. Hence, typical watermark embedding methods are not suitable for discrete signal synchronization.

In the present subject matter, various implementations, systems and methods for discrete signal synchronization are disclosed. The signal can include associated data, which can be in the form of text files, data sheets, spreadsheets, tables, radio signals, multimedia data, etc. Further, the signal can be operated on by an electronic device, such as a computer, a PDA, a mobile phone, a laptop, a tablet, a server, a consumer electronic good, and a database.

In one implementation, the system employs a pre-processing method for adding a known bit pattern in a signal. In one implementation, a preprocessing unit adds a known bit pattern in an input discrete signal. For example, an in-audible known bit pattern may be embedded in an audio signal. For this, the preprocessing unit receives the input discrete signal, for example, in the form of an audio file. The input discrete signal may be received from a system memory or may be received from a device, such as a microphone, a recorder, a discrete signal processing device or an external memory. While the aforementioned example relates to an audio signal, it will be understood that any input discrete signal can be pre-processed in a similar manner.

The received input discrete signal is segmented into a plurality of segments of equal, fixed size by processes like discrete segmentation. Thus, each resulting segment includes a fixed number of samples. In one implementation, each segment can be tagged for the purpose of identification of the plurality of segments. Typically, more the number of segments more the number of bits in the known bit pattern that can be accommodated into a given signal of fixed size.

After the received input discrete signal is segmented, each signal segment is transformed using Discrete Wavelet Transformation (DWT). DWT can be applied multiple times or at different levels based on the type of input discrete signal. The discrete wavelet transformation can be done using techniques well understood in art. For example, the discrete wavelet transformation can be performed using any one of Haar, Daubechies, Coiflet, Legendre or Symlet techniques. As will be well understood by the person skilled in the art, the DWT divides the input discrete signal into low frequency coefficients and high frequency coefficients.

In one implementation, multilevel discrete wavelet transformation is applied on each segment of the signal. For example, if the DWT level is chosen as four by the user, first the signal segment is input to first level DWT, which divides input segment into low and high frequency coefficients. The low frequency coefficients resulting from first level decomposition forms the input to next level DWT decomposition and this is repeated up to four levels. High frequency coefficients from each DWT level up to level four are arranged into a high coefficient matrix.

Thereafter, Singular Value Decomposition (SVD) is used to further decompose the high frequency coefficients. When Singular Value Decomposition (SVD) is applied on the matrix of high frequency coefficients, SVD factors the input matrix into three matrices. Out of these three, one is a diagonal matrix 'D' which is a square matrix having singular values, referred to as original singular values, as its diagonal elements and its size is equal to the number of DWT levels applied. For example, if four levels of DWT are applied to the signal, the number of original singular values obtained will be four.

In one implementation, the original singular values so obtained are modified based on a known bit pattern for signal synchronization to generate preprocessed singular values. The known bit pattern can be made from, for example, unique random binary bits which are assigned to a customer or customer dependent bar code or customer dependent logo. In one implementation, the original singular values can be annexed with the known bit pattern. Alternatively, the original singular values can be modified based on a mathematical identity or at random. In one implementation, the original singular values can be modified based on a reference code, for example a bar code or an image to generate preprocessed singular values. In another implementation the original singular values can be modified using PN sequences having auto and cross correlation properties. As readily understood by the person skilled in the art, the correlation among the PN sequences helps in determining the location of best match of bit patterns. In one implementation, one bit is added to the original singular values of one segment. Thus, in order to embed an N-bit pattern, N-successive bits are added to N-successive segments with one bit being added to one segment.

Once the preprocessed singular values are obtained, inverse SVD is performed to get second high frequency coefficient matrix. Thereafter, inverse DWT is performed on the second high frequency coefficient and second low frequency coefficients of that level to generate low frequency coefficients of next higher level. The inverse DWT may be performed as many times as the DWT was performed over the input discrete signal segments to obtain preprocessed segments with embedded known bit patterns. For example, multi level inverse DWT is performed using the modified high frequency coefficients and low frequency coefficients at four levels. The pre-processed segments can then be combined in sequence to generate the preprocessed signal.

In such a method of embedding known bit patterns, the known bit pattern is added to the singular values, and thus, the characteristics of the signal are mostly unchanged and the known bit patterns are not lost during signal processing of the preprocessed signal.

In accordance to the one implementation of the present subject matter, the preprocessed signal may be processed or modified, for example by upsampling, downsampling or using any other discrete signal processing technique. The processing of the preprocessed signal results in generation of a modified discrete signal. For further processing, the modified discrete signal can be synchronized with the preprocessed signal based on the known bit pattern. The modified discrete signal and the preprocessed signal can be received by a synchronization unit. The synchronization unit may be a part of the same discrete signal synchronization system as the preprocessing unit or may be present in a remotely located system. The remotely located system may also be provided with information regarding the preprocessing method used and the known bit pattern added during preprocessing to facilitate synchronization.

The synchronization unit segments the modified discrete signal into modified signal segments of equal size. The synchronization unit further transforms and decomposes the modified signal segments using DWT and SVD in the same manner as explained above to generate the singular values. The singular values of the modified discrete signal, so extracted, comprise the known bit patterns as embedded in the preprocessed signal. The bit patterns may be then extracted from the singular values. In one implementation, one bit is extracted from the singular values obtained from one modified segment. Furthermore, the bits so obtained from successive modified segments can be combined to form the complete extracted bit pattern.

For the synchronization, the extracted bit pattern is compared against the known bit pattern added in the preprocessed signal. In one implementation, the comparison is repeated with different starting time positions. An average time position is calculated from where the two signals substantially matches and is identified as the synchronization point. Thus, the preprocessed signal and the modified discrete signal can effectively be synchronized.

The above described system and method for discrete signal synchronization using a known bit pattern can be used to synchronize a preprocessed signal and modified discrete signal to allow for high quality signal processing. Further, the embedding technique used herein does not change the characteristics of the preprocessed signal and compression and distortion is avoided. Also, the synchronization can happen even if the modified discrete signal loses some of its original characteristics, for example due to addition or deletion of samples, as compared to the input discrete signal.

These and other advantages of the present subject matter would be described in greater detail in conjunction with the following figures. While aspects of described systems and methods for discrete signal synchronization can be implemented in any number of different computing systems, environments, and/or configuration, the embodiments are described in the context of the following exemplary system(s).

FIG. 1 illustrates a discrete signal synchronization system 102, hereinafter may be referred to as system, in accordance with an embodiment of the present subject matter. It will be understood that the system 102 can be implemented in any computing device, such as mainframe computers, workstations, personal computers, desktop computers, multiprocessor systems, laptops, network computers, minicomputers, servers, and the like. In addition, the system 102 may be a single device or a collection of devices, such as a server farm. The system 102 may also include multiple servers to perform mirrored tasks for load balancing.

In one implementation, the system 102 includes one or more processor(s) 104, input/output (I/O) interfaces 106, and a memory 108 coupled to the processor 104. The processor 104 can be a single processing unit or a number of units, all of which could include multiple computing units. The processor 104 may be implemented as one or more microprocessors, microcomputers, microcontrollers, discrete signal processors, central processing units, state machines, logic circuitries, and/or any devices that manipulate signals based on operational instructions. Among other capabilities, the processor 104 is configured to fetch and execute computer-readable instructions and data stored in the memory 108.

The I/O interfaces 106 may include a variety of software and hardware interfaces, for example, interfaces for peripheral device(s), such as a keyboard, a mouse, a display unit, an external memory, and a printer. Further, the I/O interfaces 106 may enable the system 102 to communicate with other devices, such as web servers and external databases. The I/O interfaces 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interfaces 106 may include one or more ports for connecting a number of computing systems with one another or to a network.

The memory 108 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one implementation, the memory 108 also includes modules 110 and data 118. It will be understood that in other implementations, the modules 110 and the data 118 may be present outside the memory 108, for example, in other hardware components.

The modules 110, amongst other things, include routines, programs, objects, components, data structures, etc., which perform particular tasks or implement data types. In one implementation, the modules 110 further include a preprocessing module 112, a synchronization module 113, the synchronization module further comprising extraction module 114 and comparison module 116 and other modules 117.

The other modules 117 may include programs that supplement applications on the system 102, for example, programs in the operating system.

The data 118 serves, amongst other things, as a repository for storing data processed, received, and generated by one or more of the modules 110. The data 118 includes preprocessing module data 120, extraction module data 122, comparison module data 124 and other data 126. The other data 126 includes data generated as a result of the execution of one or more modules in the modules 110.

In one implementation, the preprocessing module 112 can be configured to preprocess an input discrete signal by embedding at least one known bit pattern into the input discrete signal. In one implementation, the preprocessing module 112 can receive an input discrete signal to be processed and/or transmitted through any process well understood in the art. The preprocessing module 112 can segment the input discrete signal into a plurality of segments of an equal fixed size through processes well understood in art. For example, the input discrete signal can be segmented using unary segmentation process generating identical blocks based on a mathematical function.

The preprocessing module 112 can further apply a Discrete Wavelet Transformation (DWT) at least once on each of the plurality of segments obtained after the segmentation of the input discrete signal. In one implementation, DWT can be applied multiple times for a given signal based on the degree of extent of embedding to be achieved as specified by a user. The discrete wavelet transformation can be performed, but is not limited to, using techniques like Haar, Coiflet, Legendre or Symlet etc. As understood by the person skilled in the art, the DWT will generate low frequency coefficient and high frequency coefficient, for each segment on which it is performed.

As mentioned, multilevel discrete wavelet transformation can be applied on each of the plurality of segments. In one implementation, the size of the plurality of segments may be determined based on a predetermined parameter. The size may be chosen based on the type of signal and the time over which the characteristics of the signal remain stationary. For example, for audio signals, the signal characteristics are stationary for a period of 50 milliseconds. Thus, if the sampling of signal results 48 kilo samples per second, the segment length can be chosen as 50 milliseconds, i.e. 2400 samples. In another example, if the DWT level is chosen as four by the user, first the signal segment is input to first level DWT. This divides input segment into low and high frequency coefficients. The low frequency coefficients resulted from first level decomposition forms the input to next level DWT decomposition and this is repeated up to four levels. High frequency coefficients from each DWT level up to level four are arranged into a matrix. For example, where, CD1 is the row formed from high frequency coefficients of DWT level-1 and CD2, CD3, and CD4 are obtained from DWT level-2, level-3, and level-4 respectively. In one implementation, the size of CD1 is half the number of samples in the input segment, size of CD2 is half of CD1, size of CD3 is half of CD2, and size of CD4 is half of CD3. In such a case, the size of the matrix formed is the number of DWT levels divided by half the number of samples in a segment. For the sake of clarity and not for the purpose of limitation, the matrix can be represented as $$\begin{pmatrix} & & & CD1 & & & & \\ & & CD2 & & CD2 & & & \\ & CD3 & CD3 & & CD3 & CD3 & & \\ CD4 & CD4 & CD4 & CD4 & CD4 & CD4 & CD4 & CD4 \end{pmatrix} \quad (1)$$

The preprocessing module 112 is further configured to decompose the high frequency coefficients using Singular Value Decomposition (SVD). The Singular Value Decomposition (SVD) factors the input matrix into three matrices. Out of these three, one is diagonal matrix 'D' which is a square matrix having the original singular values as its diagonal elements and its size is equal to the number of DWT levels applied. For example, for the four level of DWT applied, there will be four original singular values. For the understanding and not for the purpose of limitation, these can be named S1, S2, S3, and S4. These original singular values are modified by embedding the known bit pattern made from, for example, unique random binary bit which are assigned to customer or customer dependent bar code or customer dependent logo. The original singular values can also be modified based on a synchronization known bit pattern designed for the signal synchronization. For example, the original singular values can be added with a known bit pattern. Alternatively, the original singular values can be modified based on a reference code, for example a bar code or an image converted into known bit patterns as well understood by person skilled in art. In one implementation, a random known bit pattern, for example, a PN sequence can be added to achieve higher accuracy. For example PN sequence can be added with auto correlation and cross correlation properties between two different bit patterns. This helps in determining the best match as each PN sequence is correlated with the another PN sequence through a mathematical or logical relationship Alternatively, a random binary bit which is assigned to a customer or customer dependent bar code or customer dependent logo can be added to the original singular value.

In one implementation, the original singular values can be annexed with the known bit pattern designed for the synchronization to obtain a preprocessed singular value. Alternatively, the original singular value can be modified based on a mathematical identity or at random to generate preprocessed singular value. In one implementation, the original singular values can be modified based on a reference code, for example a bar code or an image For example, if the known bit pattern is derived from a logo or a bar code, then the resultant one dimensional vector is converted into bipolar form i.e. 1's and −1's. Where 1's represents 1's of the known bit pattern and −1's represents 0's of the known bit pattern. S2 is updated using S1 and S4 based on known bit pattern as shown below.

$$S2 = \mathrm{alpha1}*(S1+S4)+\mathrm{alpha2}*wmbit*(S1-S4). \quad (2)$$

Where wmbit represents one bit of known bit pattern, alpha1 represents scaling factor one and alpha2 represents scaling factor two. It is worth mentioning that the S1 and S4 is not modified here and thus the problem of compression can be overcome due to consistent S1 and S4 values.

Once S2 is updated, inverse SVD is performed which combines modified D matrix, unmodified left singular vector matrix and unmodified right singular vector matrix to get second high frequency coefficient matrix and second low frequency coefficient matrix.

For example, mCD1, mCD2, mCD3, and mCD4 are modified high frequency coefficients of the modified matrix. The inverse DWT is performed on the second high frequency coefficients and second low frequency coefficients as many times as the DWT was performed over the input discrete signal segments to generate pre-processed discrete signal. For example, multi level inverse DWT is performed using the modified high frequency coefficients and low frequency coefficients of four-level DWT. It leads to generation of processed signal which comprises embedded known bit pattern.

The preprocessed signal so generated, does not lose the original characteristics since the known bit pattern is embedded in the singular values. The preprocessed signal may be processed by other components in the discrete signal synchronization system 102 as a result of which samples may be added or deleted to the preprocessed signal, thereby generating a modified discrete signal.

The discrete signal synchronization system 102 is further configured to synchronize the modified discrete signal with the preprocessed signal. For this, the discrete signal synchronization system 102 includes a synchronization module 113. The synchronization module 113 can extract various known bit patterns from the modified discrete signal and compare the extracted bit patterns with the known bit patterns embedded in the preprocessed signal to determine the synchronization time point. Towards this end, the synchronization module 113 includes the extraction module 114 and the comparison module 116.

The extraction module 114 segments the modified discrete signal into a plurality of modified segments of equal size. The extraction module 114 further transforms the plurality of modified segments using at least one level of DWT to obtain the low frequency coefficients and high frequency coefficients in the same way as performed by preprocessing module 112. The extraction module 114 then transforms the high frequency coefficients using SVD to obtain a plurality of singular values as also explained above. Further, the extraction module 114 extracts bit patterns at different starting time positions of the modified discrete signal and provides the extracted bit patterns to the comparison module 116. The bit patterns are extracted based on following relationship Bit pattern=0, if $S(2,2)<($alpha1$^*(S(1,1)+S(4,4)))$ (3)

Bit pattern=1, if $S(2,2)>=($alpha1$^*(S(1,1)+S(4,4)))$ (4)

The value of alpha 1 and alpha 2 is same as the one used in preprocessing module. S (n, n) signifies the nth singular value.

In one implementation, extraction module 114 is configured to extract one bit from the plurality of singular values obtained from one modified segment. Additionally, the one bit so obtained from successive modified segments can be combined to form the complete bit pattern. The comparison module 116 is configured to compare the extracted bit patterns against the known bit patterns added by the preprocessing module 112. The comparison module 116 is further configured to compare known bit patterns with the extracted bit pattern to locate the time position from where the modified discrete signal and the preprocessed signal are in synchronization. The time position for the match of known bit pattern with the extracted bit pattern is recorded as the synchronization time position for preprocessed and modified discrete signals.

Figure 2:
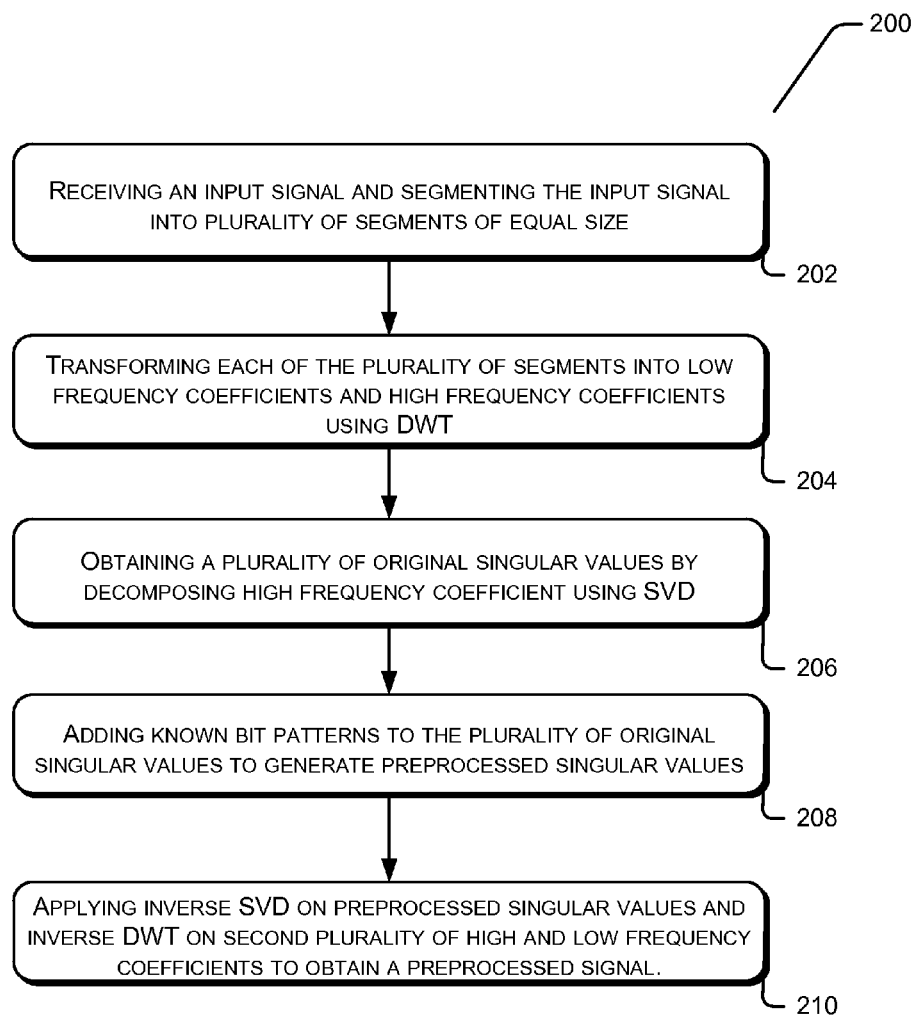
FIG. 2 illustrates a method for generating a preprocessed signal for discrete signal synchronization, in accordance with an embodiment of the present subject matter.
Figure 3:
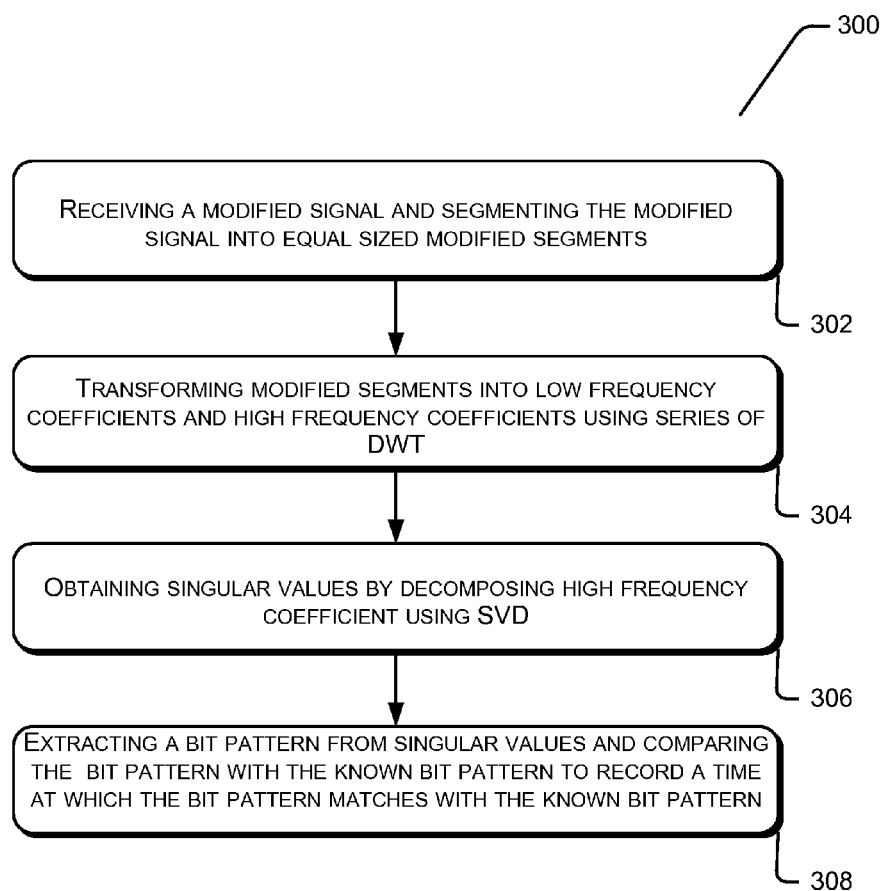
FIG. 3 illustrates a method for discrete signal synchronization using a preprocessed and modified discrete signal in accordance with an embodiment of the present subject matter.

FIGS. 2 and 3 illustrate a method 200 to generate a preprocessed signal with embedded known bit pattern for discrete signal synchronization and a method 300 for discrete signal synchronization using the known bit pattern embedded signal, according to one embodiment of the present subject matter. The methods can be implemented in different systems of data transmission well known in art. For example the methods can be implemented in any system comprising a discrete signal processing unit which can process discrete signals. Alternatively, the methods 200 and 300 can be implemented in a variety of computing systems through modules such as hardware units or software programs and the like. For example, the methods described herein, can be implemented using the discrete signal synchronization system 102 as described above. It will also be understood that the methods 200 and 300 can be implemented on the same system or on different systems.

The order in which the methods 200 and 300 are described is not intended to be construed as a limitation, and any number of the described method blocks can be combined in any order to implement the methods, or an alternative method. Additionally, some of the individual blocks can be deleted from the methods without departing from the spirit and scope of the subject matter described herein. Furthermore, the methods can be implemented in any suitable hardware, software, firmware, or combination thereof. It will be understood that even though the methods 200 and 300 are described with reference to the discrete signal synchronization system 102, the description can be extended to other systems as well.

At block 202, an input discrete signal is received and segmented into a plurality of segments of equal size using methods well understood in art. The input discrete signal can be received through a receiver, audio file, a discrete or analog converter resource, an internal memory, an external memory and the like. The segmentation can be achieved, for example, by using unary segmentation process. In one implementation, the plurality of segments can be discretely tagged by a process well understood in art to identify each of the plurality of segment during processing.

At block 204, each of the plurality of segments of signal is transformed using Discrete Wavelet Transformation or DWT into a plurality of low and high frequency coefficients. DWT can be performed using different method well understood in art. For example, DWT can be performed using Haar, Coiflet, Legendre or symlet technique of transformation. In one implementation, DWT can be performed in series or levels, to obtain coefficient of desired measures so as to effectively embed the signal with known bit pattern. The high frequency coefficients are selected at each level of DWT for the next DWT in series. As will be well understood by the person skilled in the art, the DWT divides the input discrete signal into low and high frequency coefficients.

In one implementation, multilevel discrete wavelet transformation is applied on each segment of the signal. For example, if the DWT level is chosen as four by the user, first the signal segment is input to first level DWT, this divides input audio frame into low and high frequency coefficients, the low frequency coefficients resulted from first level decomposition forms the input to next level DWT decomposition and this is repeated up to four levels. High frequency coefficients from each DWT level up to level four is arranged into a matrix as discussed earlier. For example, where, CD1 is the row formed from high frequency coefficients of DWT level-1 and CD2, CD3, and CD4 are obtained from DWT level-2, level-3, and level-4 respectively. The size of CD1 is half the number of samples in the input audio segment, size of CD2 is half of CD1, size of CD3 is half of CD2, and size of CD4 is half of CD3. The size of the matrix formed is the number of DWT levels by half the number of samples in an audio frame. For the sake of clarity and not for the purpose of limitation, the matrix can be represented as illustrated in reference equation (1) of this disclosure.

At block 206, Singular Value Decomposition (SVD) is used to further decompose the resultant high frequency coefficients obtained from the one or more levels of DWT to obtain a plurality of original singular values. As understood by a person skilled in the art, the SVD decomposition leads to generation of a left singular vector, a right singular vector, and the plurality of original singular values. Singular Value Decomposition (SVD) is used to further decompose the high frequency coefficients. When Singular Value Decomposition (SVD) is applied on the matrix of high frequency coefficients, SVD factors the input matrix into three matrices. Out of these three, one is diagonal matrix 'D' which is a square matrix having original singular values as its diagonal elements and its size is equal to the number of DWT levels applied. For example, if four levels of DWT are applied to the signal, the original singular values obtained will be four. Here these original singular values can be named S1, S2, S3, and S4. These original singular values are used to embed the known bit pattern made from either unique random binary bit which is assigned to customer or customer dependent bar code or customer dependent logo. The known bit pattern is converted into single dimensional vector if it is a two dimensional matrix.

At block 208, the plurality of original singular values so obtained are modified by adding known bit pattern designed for signal synchronization to generate preprocessed singular values. The preprocessed singular values are obtained after modifying the plurality of original singular values with right singular vector and left singular vector. For example, a known bit pattern is added to the original singular known bit pattern to modify the original singular values to generate preprocessed singular values. Alternatively, the original singular values can be modified based on a reference code, for example a bar code or an image by converting it into a known bit pattern and adding to the original singular values as is well understood in the art. For example, the original singular value known bit pattern can be annexed with the known bit pattern designed for the synchronization. In one implementation, the original singular value can be annexed with correlated PN sequences for greater accuracy. Alternatively, the original singular value known bit pattern can be modified based on a mathematical identity or at random. In one implementation, the original singular values can be modified based on a reference code, for example a bar code or an image For example, if the known bit pattern is derived from a logo or a bar code, then the resultant one dimensional vector is converted into bipolar form i.e. 1's and −1's. Where 1's represents 1's of known bit pattern and −1's represents 0's of known bit pattern. S2 is updated using S1 and S4 based on equation (2) of this disclosure, where wmbit represents one bit of the known bit pattern, alpha1 represents scaling factor one and alpha2 represents scaling factor two.

At block 210, a preprocessed signal is obtained by applying inverse SVD on preprocessed singular values and inverse DWT on second plurality of high frequency coefficients and second plurality of low frequency coefficients. The preprocessed singular values are used to obtain modified high frequency coefficients using inverse SVD technique. The modified high frequency coefficients are further used to obtain the preprocessed signal using inverse DWT. For example, mCD1, mCD2, mCD3, and mCD4 are modified high frequency coefficients extracted from the modified matrix. The inverse DWT is performed as many times as the DWT was performed over the input discrete signal segments. The plurality of segments can be combined in sequence to generate the preprocessed signal. For example, multi level inverse DWT is performed using these modified high frequency coefficients and low frequency coefficients of four-level DWT. It leads to generation of processed signal which comprises of embedded known bit pattern. The preprocessed signal can be transmitted to another system for further processing or can be further processed on the same system.

FIG. 3 illustrates a method for discrete signal synchronization using the modified discrete signal.

At block 302, a modified discrete signal is received after the preprocessed signal is processed, for example, by a series of processes in the device. The modified signal is segmented into equal sized modified segments. The segmentation can be achieved through different processes well understood in art. For example, the segmentation can be achieved using unary segmentation process for segmenting the signals. In one implementation, the segments may be digitally tagged to recognize the different segments in operation during a process.

At block 304, each modified segment of modified discrete signal is transformed using DWT into low and high frequency coefficients. DWT can be performed using different methods, well understood in art. For example, DWT can be performed using Haar, Coiflet, and Legendre or symlet technique of transformation. In one implementation, DWT can be performed in series or levels, with the same number of DWT being used as used during preprocessing to add the known bit pattern in the input discrete signal.

At block 306, the high frequency coefficients obtained from the one or more DWT are further decomposed using Singular Value Decomposition (SVD) to obtain a plurality of singular values. As understood by a person skilled in the art, this decomposition leads to generation of a left singular vector, a right singular vector, and a plurality of singular values. The plurality of singular values are extracted based on equation (3) and equation (4) of this disclosure. The value of alpha 1 and alpha 2 is same as the one used in preprocessing module 112. S(n, n) signifies the nth Singular values.

At block 308, singular values so obtained are used to extract a bit pattern to compare with the known bit pattern to record a time at which the bit pattern matches the known bit pattern. In one implementation, one bit from the plurality of singular values is obtained from one modified segment. Additionally, the one bit so obtained from successive modified segments can be combined to form the complete bit pattern. The extracted bit pattern is compared against the known bit pattern inserted by the preprocessing module 112. In one implementation, the comparison is repeated with respect to different time positions. The time at which the extracted bit pattern matches with the known bit pattern of preprocessed signal is recorded as the synchronization point Although implementations of systems and methods for discrete signal synchronization have been described in language specific to structural features and/or methods, it is to be understood that the appended claims are not necessarily limited to the specific features or methods described. Rather, the specific features and methods are disclosed as example implementations of the systems and methods for discrete signal synchronization.

The invention claimed is:

1. A discrete signal synchronization system configured to synchronize a preprocessed discrete signal with a modified discrete signal, the discrete signal synchronization system comprising:
   a processor; and
   a synchronization module coupled to the processor, wherein the synchronization module comprises:
      an extraction module configured to determine a bit pattern based on a plurality of singular values, wherein the plurality of singular values are obtained from Discrete Wavelet Transformation (DWT) and Singular Value Decomposition (SVD) of the modified discrete signal; and
      a comparison module configured to compare the bit pattern with a known bit pattern of the preprocessed discrete signal and to record a time point at which the bit pattern matches with the known bit pattern as a synchronization point.

2. The discrete signal synchronization system as claimed in claim 1, further comprising a preprocessing module coupled to the processor, wherein the preprocessing module is configured to;
   segment an input discrete signal into a plurality of segments;
   transform each of the plurality of segments into a plurality of low frequency coefficients and a plurality of high frequency coefficients using at least one level of the DWT;
   decompose the plurality of high frequency coefficients into a plurality of original singular values using the SVD;
   add the known bit pattern to the plurality of original singular values to generate a plurality of preprocessed singular values;
   apply inverse SVD on the plurality of preprocessed singular values to obtain a second plurality of high frequency coefficients and a second plurality of low frequency coefficients; and
   apply inverse DWT on the second plurality of high frequency coefficients and the second plurality of low frequency coefficients to obtain the preprocessed discrete signal.

3. The discrete signal synchronization system as claimed in claim 1, wherein the extraction module is further configured to:
   segment the modified discrete signal into a plurality of modified segments;

transform the plurality of modified segments by the DWT into a plurality of high frequency coefficients and a plurality of low frequency coefficients;

apply the SVD to decompose the plurality of high frequency coefficients to obtain the plurality of singular values; and extract the bit pattern from the plurality of singular values of the modified discrete signal.

4. The discrete signal synchronization system as claimed in claim 3, wherein a length of the plurality of modified segments is based on a predetermined parameter.

5. The discrete signal synchronization system as claimed in claim 3, wherein the plurality of high frequency coefficients is obtained from a multilevel DWT, and wherein the multilevel DWT comprises a series of DWT applied on the plurality of high frequency coefficients.

6. The discrete signal synchronization system as claimed in claim 3, wherein the extraction module extracts one bit from the plurality of singular values of a single modified segment.

7. The discrete signal synchronization system as claimed in claim 6, wherein the extraction module combines extracted bits of successive modified segments to form the bit pattern.

8. The discrete signal synchronization system as claimed in claim 1, wherein the known bit pattern is obtained from at least one of a known code, a barcode, an image bit pattern, a bit pattern based on a mathematical equation, and a Pseudorandom Noise sequence.

9. The discrete signal synchronization system as claimed in claim 1, wherein the DWT is applied by at least one of Haar, Daubechies, Coiflet, Legendre, or Symlet techniques.

10. The discrete signal synchronization system as claimed in claim 1, wherein the comparison module is configured to record the time point starting at different time positions to determine the bit pattern that matches with the known bit pattern as the synchronization point.

11. The discrete signal synchronization system as claimed in claim 1, wherein the modified discrete signal is obtained from processing a preprocessed signal.

12. A method for discrete signal synchronization to synchronize a preprocessed discrete signal with a modified discrete signal, the method comprising:

determining, by a processor, a bit pattern based on a plurality of singular values, wherein the plurality of singular values are obtained from Discrete Wavelet Transformation (DWT) and Singular Value Decomposition (SVD) of the modified discrete signal;

comparing, by the processor, the determined bit pattern with a known bit pattern of the preprocessed discrete signal; and recording, by the processor, a time point at which the determined bit pattern matches with the known bit pattern as a synchronization point.

13. The method as claimed in claim 12, the method further comprising:

segmenting, by the processor, an input discrete signal into a plurality of segments;

transforming, by the processor, each of the plurality of segments into a plurality of low frequency coefficients and a plurality of high frequency coefficients using at least one level of the DWT;

decomposing, by the processor, the plurality of high frequency coefficients into a plurality of original singular values using the SVD;

adding, by the processor, the known bit pattern to the plurality of original singular values to generate a plurality of preprocessed singular values;

applying, by the processor, inverse SVD on the plurality of preprocessed singular values to obtain a second plurality of high frequency coefficients and a second plurality of low frequency coefficients; and applying, by the processor, inverse DWT on the second plurality of high frequency coefficients and the second plurality of low frequency coefficients to obtain the preprocessed discrete signal.

14. The method as claimed in claim 12, wherein determining the bit pattern based on the plurality of singular values comprises:

segmenting, by the processor, the modified discrete signal into a plurality of modified segments;

transforming, by the processor, the plurality of modified segments by the DWT into a plurality of high frequency coefficients and a plurality of low frequency coefficients;

applying, by the processor, the SVD to decompose the plurality of high frequency coefficients to obtain the plurality of singular values; and extracting, by the processor, the bit pattern from the plurality of singular values of the modified discrete signal.

15. The method as claimed in claim 14, wherein a length of the plurality of modified segments is based on a predetermined parameter.

16. The method as claimed in claim 14, wherein the plurality of high frequency coefficients is obtained from a multilevel DWT, and wherein the multilevel DWT comprises a series of DWT applied on the plurality of high frequency coefficients.

17. The method as claimed in claim 14, wherein one bit is extracted from the plurality of singular values of a single modified segment and wherein extracted bits of successive modified segments are combined to form the bit pattern.

18. The method as claimed in claim 12, wherein the known bit pattern is obtained by at least one of a known code, a barcode, an image bit pattern, a bit pattern based on a mathematical equation, and a Pseudorandom Noise sequence.

19. The method as claimed in claim 12, wherein the time point is recorded starting at different time positions to determine the bit pattern that matches with the known bit pattern as the synchronization point.

20. A non-transitory computer-readable medium having embodied thereon a computer program executable by a processor for executing a method for synchronizing a preprocessed discrete signal with a modified discrete signal, the method comprising:

determining a bit pattern based on a plurality of singular values, wherein the plurality of singular values are obtained from Discrete Wavelet Transformation (DWT) and Singular Value Decomposition (SVD) of the modified discrete signal;

comparing the determined bit pattern with a known bit pattern of the preprocessed discrete signal; and recording a time point at which the determined bit pattern matches with the known bit pattern as a synchronization point.

* * * * *